United States Patent

Koenig, Jr. et al.

[11] Patent Number: 5,813,179
[45] Date of Patent: Sep. 29, 1998

[54] DRYWALL-TRIMMING ASSEMBLY EMPLOYING PERFORATED SPLICE

[75] Inventors: Joseph M. Koenig, Jr., Lincolnwood; Leopold Budzik; Mark Budzik, both of Niles, all of Ill.

[73] Assignee: Trim-Tex, Inc., Lincolnwood, Ill.

[21] Appl. No.: 631,781

[22] Filed: Apr. 12, 1996

Related U.S. Application Data

[63] Continuation-in-part of Ser. No. 609,848, Mar. 1, 1996.

[51] Int. Cl.$^6$ ...................................................... E04B 2/00
[52] U.S. Cl. ............................ 52/255; 52/287.1; 52/726.1; 403/267; 403/294; 403/402
[58] Field of Search ............................... 52/287.1, 288.1, 52/254, 255, 256, 257, 417, 216, 726.1, 726.2; 403/265, 266, 267, 401, 402, 292, 293, 294, 298

[56] References Cited

U.S. PATENT DOCUMENTS

| | | | |
|---|---|---|---|
| Re. 34,547 | 2/1994 | Weldy | 52/288.1 |
| 1,430,508 | 9/1922 | Johnson | 52/256 |
| 2,536,386 | 1/1951 | Moore | 403/265 |
| 2,946,414 | 7/1960 | Gordon et al. | 52/726.1 |
| 3,742,668 | 7/1973 | Oliver | 52/288.1 |
| 3,956,861 | 5/1976 | Rasmussen | 52/287 |
| 4,436,343 | 3/1984 | Schneider | 403/267 |
| 4,569,171 | 2/1986 | Kuhr et al. | 52/242 |
| 4,642,957 | 2/1987 | Edwards | 52/242 |
| 4,873,806 | 10/1989 | Jeschke | 52/726.1 |
| 5,001,877 | 3/1991 | Edwards | 52/288 |
| 5,003,743 | 4/1991 | Bifano et al. | 52/282 |
| 5,179,811 | 1/1993 | Walker et al. | 52/287 |
| 5,233,804 | 8/1993 | Miller | 52/288.1 |
| 5,350,227 | 9/1994 | Katz | 312/198 |
| 5,398,469 | 3/1995 | Logan | 52/288.1 |
| 5,457,923 | 10/1995 | Logan et al. | 52/288.1 |
| 5,531,051 | 7/1996 | Chenier et al. | 52/257 |
| 5,544,463 | 8/1996 | Bergin | 52/288.1 |

FOREIGN PATENT DOCUMENTS

| | | | |
|---|---|---|---|
| 2300789 | 7/1974 | Germany | 52/726.2 |
| 6-146405 | 5/1994 | Japan | 52/726.2 |

*Primary Examiner*—Michael Safavi
*Attorney, Agent, or Firm*—Dressler, Rockey, Milnamow & Katz, Ltd.

[57] ABSTRACT

In a drywall corner-trimming assembly, a splice is employed with two corner-trimming members, which approximate each other at one end of each member. Each member has a central portion and two flanged portions. With the splice straddling the members, a portion of one expansive surface of the splice faces the interior surface of the central portion of each member, which portion is located where the splice has at least one of the perforations. An adhesive layer is interposed between the same one of the expansive surfaces of the splice and the interior surfaces of the central portions of the members and is ventilated by the perforations.

3 Claims, 1 Drawing Sheet

DRYWALL-TRIMMING ASSEMBLY EMPLOYING PERFORATED SPLICE

CROSS REFERENCE TO RELATED APPLICATION

This application is a continuation-in-part of a copending patent application, which was filed on Mar. 1, 1996, by Joseph M. Koenig, Jr., Leopold Budzik, and Mark Budzik under Ser. No. 08/609,848 and entitled "DRYWALL CORNER-TRIMMING ASSEMBLY RESISTING BUTT-EDGE SEPARATION", which is assigned commonly with this application, and the disclosure of which is incorporated herein by reference.

TECHNICAL FIELD OF THE INVENTION

This invention pertains to a drywall-trimming asembly, which comprises two trimming members approximating each other at one end of each member, particularly but not exclusively a drywall corner-trimming assembly providing a so-called "bullnose" configuration having an exterior radius of at least about three-fourths inch. According to this invention, a splice is attached to the approximating members by an adhesive layer, which is ventilated by perforations in the splice.

BACKGROUND OF THE INVENTION

In residential construction and commercial construction, it is common to employ a straight corner-trimming strip (corner bead) to trim a corner where two drywall panels approximate each other at a right angle or at an obtuse angle. Commonly, such a trimming strip is extruded from a suitable polymer, such as polyvinyl chloride. Commonly, such a trimming strip has a central portion having two lateral edges and two flanged portions, each of which extends from one of the lateral edges of the central portion. When such a trimming strip is installed, the flanged portions are secured to the drywall panels, as by staples or by an adhesive.

If the trimming strip is designed to provide the trimmed corner with a so-called "bullnose" configuration, the central portion has a generally arcuate profile defining a concave surface and a convex surface, and the convex surface has an exterior radius of at least about three-fourths inch. The generally arcuate profile may encompass from about 45° to about 135°. Moreover, each of the flanged portions extends from the one of the lateral edges of the central portion at a step, which defines a lateral limit of the concave surface of the central portion.

Such straight "bullnose" corner-trimming strips are supplied in standard lengths, such as eight, ten, or twelve feet, and are cut to shorter lengths depending upon requirements of each installation. Such straight "bullnose" corner-trimming strips (corner beads) extruded from polyvinyl chloride are available commercially from Trim-Tex, Inc. of Lincolnwood, Ill., under its TRIM-TEX trademark.

As a common expedient to avoid wastage or so as to deal with long corners, two or more relatively short, straight corner-trimming strips approximating one other at adjacent ends, which may be called butt edges, are employed where a relatively long corner-trimming strip would be otherwise needed. In some applications, such an expedient can be quite unsatisfactory, as it can be very difficult to avoid rotational misalignment of the approximating strips about an axis defined by the generally arcuate profiles of the central portions when the flanged portions are secured to the drywall panels.

Commonly, such straight "bullnose" corner-trimming strips are employed with two-legged (two-way) "bullnose" corners and with three-legged (three-way) "bullnose" corners. Commonly, such two-legged and three-legged "bullnose" corners are molded so as to have arcuate tongues, which extend from their respective legs and which are designed to slip beneath such straight outside-corner trimming strips. Such two-legged (two-way) and three-legged (three-way) "bullnose" corners molded from polyvinyl chloride are available commercially from Trim-Tex, Inc. of Lincolnwood, Ill., under its TRIM-TEX trademark. Similar "bullnose" corners are disclosed in Weldy et al. U.S. Pat. No. Re. 34,547. Because such straight "bullnose" corner trimming strips are extruded in standard lengths and are cut to shorter lengths depending upon requirements of each installation, it is not practical to provide molded tongues on the ends of such strips.

Heretofore, so as to resist rotational misalignment, it has been suggested by another to splice such straight "bullnose" corner-trimming strips with generally arcuately profiled splices, which are cut from the center portions of similar strips and which help to align such strips.

Besides rotational misalignment, another problem that can occur with such straight "bullnose" corner-trimming strips and with such two-legged and three-legged "bullnose" corners is so called "butt-edge separation" which refers to separation that can occur at the ends where such strips approximate each other or where such a strip approximates one leg of such a corner, and which can lead to unsightly conditions, such as cracked paint.

Heretofore, so as to resist butt-edge separation, it has been known to splice drywall-trimming strips of another type having generally sharp-cornered profiles defining flat interior and exterior surfaces with flat splices, which are secured adhesively to the flat interior surfaces of such strips where such strips approximate one another.

In the copending application noted above, a novel arangement is disclosed wherein the approximating members and the splice are assembled so that the splice straddles such members, so that a portion of one of the expansive surfaces of the splice faces the concave surface of the central portion of each of such members, so that the splice is concealed at least substantially by the central portions of such members when the convex surfaces of the central portions of such members are viewed, and so that each of the lateral edges of the elongate splice is pressed firmly against the step at one of the lateral edges of the central portions of each of such members, whereby the lateral edges of the central portions of such members are aligned by the splice. Having the lateral edges pressed firmly against the steps, the splice prevents rotational misalignment of the approximating members about the axis noted above.

As disclosed in the copending application noted above, the splice may be adhesively secured to the approximating members. If a layer of a construction adhesive of a type used commonly by a drywall installer is used, it may become necessary for the drywall installer to hold the approximating members and the splice until the construction adhesive has set sufficiently to permit the drywall installer to stop holding the approximating members and the splice, so as to avoid butt-edge separation or other problems. However, the setting time of the adhesive layer may be quite long, particularly if the adhesive layer is not ventilated.

SUMMARY OF THE INVENTION

This invention provides a drywall-trimming assembly, such as a drywall corner-trimming assembly, which comprises two corner-trimming members approximating each other at one end of each member and which comprises a splice. If the drywall-trimming assembly is a drywall corner-trimming assembly, each member is a drywall corner-trimming member. Each member has a central portion with two lateral edges and two flanged portions extending respectively from the lateral edges of the central portion and the central portion has an interior surface and an exterior surface. The splice has two expansive surfaces, two lateral edges, and perforations spaced along the splice.

According to this invention, the members and the splice are assembled so that the splice straddles said members and so that a portion of a given one of the expansive surfaces faces the interior surface of the central portion of each of the members, which portion is located where the splice has at least one of the perforations, and an adhesive layer is interposed between the same one of the expansive surfaces of the splice and the interior surfaces of the central portions of the members. The splice resists butt-edge separation of the members.

Because the perforations ventilate the adhesive layer so as to accelerate drying or curing of the adhesive layer, a construction adhesive of the type noted above may be used to provide the adhesive layer, which tends more quickly to set sufficiently to permit the drywall installer to stop holding the approximating members and the splice.

Preferably, as disclosed in the copending application noted above, the central portion of each member has a generally arcuate profile, the interior surfaces being concave and the exterior surfaces being convex, and each flanged portion of each member extends from one of the lateral edges of the central portion of such member. Preferably, moreover, each flanged portion of each member extends from one of the lateral edges of the central portion of such member at a step defining a lateral limit of the concave surface of the central portion of such member and the members and the splice are assembled so that the splice is stressed into a generally arcuate profile between the steps at the lateral edges of the splice and so that each of the lateral edges of the splice is pressed firmly against the step at one of the lateral edges of the central portion of each of said members. Preferably, furthermore, the ends at which the members approximate each other define generally right angles with the lateral edges of the central portions of the members so that the members are aligned generally with each other.

Hereinbefore and hereinafter, and in the appended claims, all references to a corner-trimming member are intended to refer either to a corner-trimming strip or to one leg of a two-legged or three-legged corner, as discussed above.

These and other objects, features, and advantages of this invention are evident from the following description of a preferred embodiment of this invention, with reference to the accompanying drawings.

DETAILED DESCRIPTION OF THE ILLUSTRATED EMBODIMENTS

Figure 1:
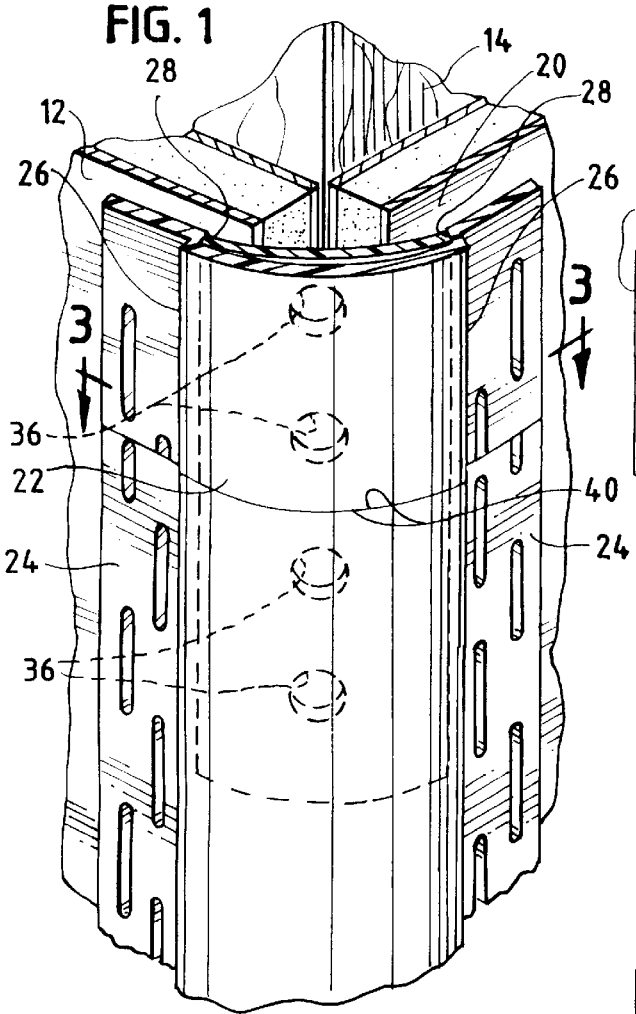
FIG. 1 is a fragmentary, assembled, perspective view of a building structure comprising a wooden stud, two drywall panels defining an outside, vertical corner, and a drywall corner-trimming assembly according to a preferred embodiment of this invention and comprising two straight corner trimming-strips and a splice.
Figure 2:
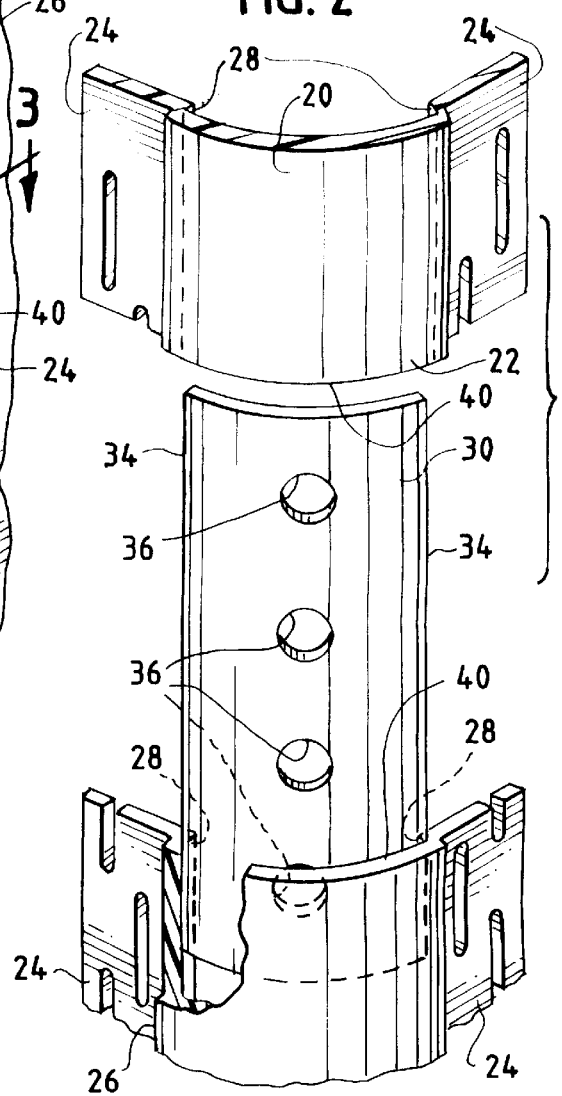
FIG. 2 is a fragmentary, exploded, perspective view of the straight corner trimming-strips and the splice.
Figure 3:
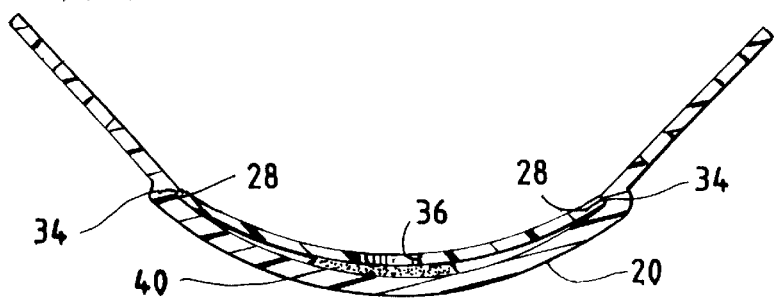
FIG. 3 is a cross-sectional view of the drywall corner-trimming assembly, as taken along line 3—3 of FIG. 1, in a direction indicated by arrows.

As shown in FIGS. 1, 2, and 3, a drywall corner-trimming assembly 10, which is employed for trimming an outside, vertical corner where two drywall panels 12 mounted to a wooden stud 14 approximate each other at a right angle, constitutes a preferred embodiment of this invention. Broadly, the assembly 10 comprises two straight "bullnose" corner-trimming strips 20 approximating each other at one end of each of the strips 20 and a splice 30, which is employed to join the strips 20.

The strips 20 are regarded as approximating each other if positioned so as to touch each other at one end of each strip 20, as shown, or so as to be approximately touching each other at one end of each strip 20, preferably with no more than a small gap (e.g. no more than a few millimeters) between their approximately touching ends.

As shown, each strip 20 has a central portion 22 and two flanged portions 24, each of which has a pattern of punched slots to promote adherence of drywall-finishing material. The central portion 22 of each strip 20 has a generally arcuate profile defining a concave surface with an interior radius and a convex surface with an exterior radius and has two lateral edges 26. Each of the flanged portions 24 of each strip 20 extends from one of the lateral edges 26 of the central portion 22 of such strip 20 at a step 28 defining a lateral limit of the concave surface of the central portion 22 of such strip 20.

When the strips 20 are installed, the flanged portions 24 are secured to the drywall panels 12, as by staples (not shown) or by a sprayed-on adhesive. The strips 20 are extruded from a suitable polymer, such as polyvinyl chloride, and are similar to the commercially available "bullnose" corner-trimming strips (corner beads) discussed above. So as to facilitate painting, the trimming strips 20 may be pre-primed on their surfaces that are to be later painted, as discussed below.

As shown, the splice 30 has two expansive surfaces 32, two lateral edges 34, and four perforations 36 spaced along the splice 30. The splice 30 is extruded from a suitable polymer, such as polyvinyl chloride, so as to have a generally arcuate profile, as shown in FIG. 4, when unstressed or so as to be generally flat when unstressed. After it has been extruded, the splice 30 is punched to provide the spaced perforations 36, which may be circular holes, as shown, or elongate slots (not shown) extending longitudinally or transversely.

As shown in FIGS. 1, 2, and 3, the approximating strips 20 and the splice 30 are assembled so that the lateral edges 26 of the central portions 22 of such strips are aligned by the splice so as to prevent rotational misalignment. Specifically, the approximating strips 20 and the splice 30 are assembled so that the splice 30 straddles such strips 20, so that a portion of one of the expansive surfaces 32 of the splice 30 faces the concave surface of the central portion 22 of each of such strips 20, so that the portion facing the concave surface includes two of the spaced perforations 36, so that the splice 30 is concealed at least substantially by the central portions 22 of such strips 20 when the convex surfaces of the central portions 22 of such strips 20 are viewed, and so that each of the lateral edges 34 of the elongate splice 30 is pressed firmly against the step 28 at one of the lateral edges 26 of the central portion 22 of each of such strips 20. As shown in FIG. 3, so that the lateral edges 34 are pressed firmly against the steps 28, the splice is stressed into a generally arcuate profile between the steps 28 at the lateral edges 34 of the splice 30, the generally arcuate profile defining an exterior radius that is greater than the interior and exterior radii of the central portions 22 of the approximating strips 20.

Moreover, so as to resist butt-edge separation, the splice 30 is secured adhesively to the approximating strips 20 in adhesive areas, which are centered between the lateral edges 26 of the central portions 22 of such strips 20 and between the lateral edges 34 of the splice 30, by an adhesive layer 40, which may be applied by extruding, spraying, or otherwise in a longitudinal or zig-zag pattern along the splice 30 or along the central portions 22 of the approximating strips 20.

The spaced perforations 36 ventilate the adhesive layer 40 so as to accelerate drying or curing of the adhesive layer 40. Hence, a construction adhesive of the type noted above may be used to provide the adhesive layer 40, as exemplified by MIRACLE DSA-20 adhesive available commercially from Miracle Adhesives Corporation of Newark, N.J., and by LIQUID NAILS adhesive available commercially from The Glidden Company of Cleveland, Ohio.

After the assembly 10 has been installed, the flanged portions 24 of the strips 20 are finished with drywall finishing material in a known manner, whereupon the trimmed corner may be then painted.

As shown in the drawings and described above, the preferred embodiment of this invention is a drywall corner-trimming assembly, in which the approximating members are drywall corner-trimming strips. Alternatively, one of the approximating members could be a two-legged or three-legged corner, as discussed hereinbefore. Alternatively, the drywall-rimming strips could have generally sharp-cornered profiles, such as generally square-cornered profiles, which define flat interior and exterior surfaces, whereupon the splice would be generally flat.

Various other modifications may be made in the embodiments discussed above without departing from the scope and spirit of this invention.

We claim:

1. A drywall corner-trimming assembly comprising two corner-trimming members approximating each other at one end of each member and comprising a splice, each member having a central portion with two lateral edges and two flanged portions extending respectively from the lateral edges of the central portion, the central portion having an interior surface and an exterior surface, the splice having two expansive surfaces two lateral edges and perforations spaced along the splice, wherein the central portion of each member has a generally arcuate profile, the interior surfaces being concave and the exterior surfaces being convex, wherein each flanged portion of each member extends from one of the lateral edges of the central portion of said member, wherein the members and the splice are assembled so that the splice straddles said members and so that a portion of a given one of the expansive surfaces faces the interior surface of the central portion of each of the members, which portion that faces the interior surface is located where the splice has at least one of the perforations, and wherein an adhesive layer is interposed between the same one of the expansive surfaces of the splice and the interior surfaces of the central portions of the members and is ventilated by the perforations, whereby the splice resists butt-edge separation of said members.

2. The drywall corner-trimming assembly of claim 1 wherein each flanged portion of each member extends from one of the lateral edges of the central portion of said member at a step defining a lateral limit of the concave surface of the central portion of said member and wherein the members and the splice are assembled so that the splice is stressed into a generally arcuate profile between the steps at the lateral edges of the splice and so that each of the lateral edges of the splice is pressed firmly against the step at one of the lateral edges of the central portion of each of said members.

3. The drywall corner-trimming assembly of claim 1 wherein the ends at which the members approximate each other define generally right angles with the lateral edges of the central portions of the members so that the members are aligned generally with each other.

\* \* \* \* \*